Dec. 19, 1967 W. P. ZABEL, JR 3,358,858
UNLOADING SYSTEM FOR BULK MATERIALS
Filed Oct. 23, 1965
3 Sheets-Sheet 1
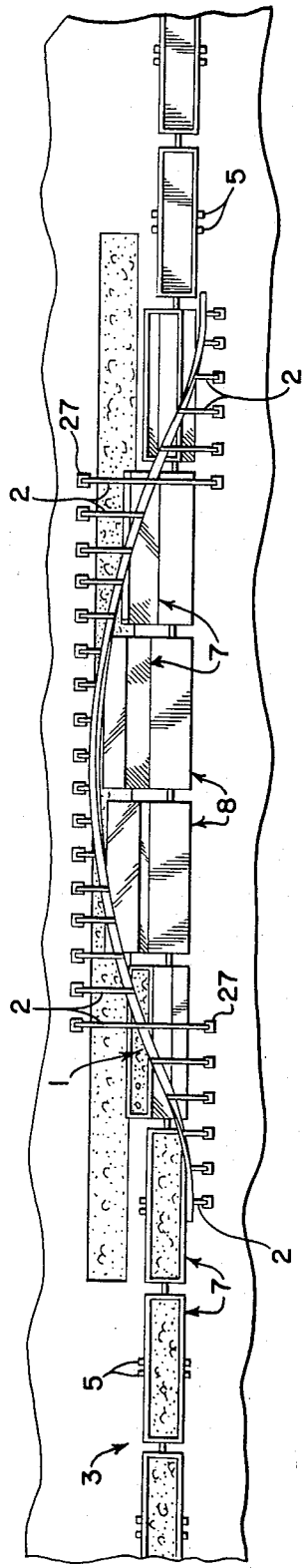
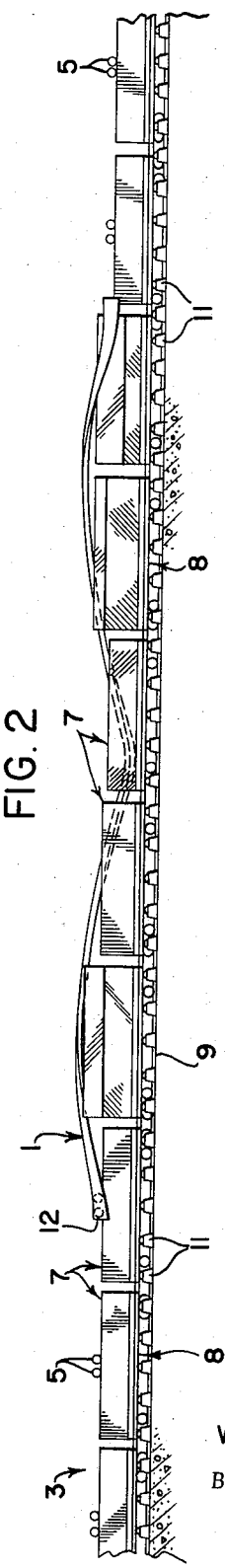
INVENTOR.
WILLIAM P. ZABLE, JR.
BY
*Fay & Fay*
ATTORNEYS Dec. 19, 1967  W. P. ZABEL, JR  3,358,858
UNLOADING SYSTEM FOR BULK MATERIALS
Filed Oct. 23, 1965  3 Sheets-Sheet 2

INVENTOR.
WILLIAM P. ZABLE, JR.
BY
*Fay & Fay*
ATTORNEYS

Dec. 19, 1967 W. P. ZABEL, JR 3,358,858
UNLOADING SYSTEM FOR BULK MATERIALS
Filed Oct. 23, 1965 3 Sheets-Sheet 3

INVENTOR.
WILLIAM P. ZABLE, JR.
BY
Fay & Fay
ATTORNEYS

United States Patent Office 3,358,858
Patented Dec. 19, 1967

3,358,858
UNLOADING SYSTEM FOR BULK MATERIALS
William P. Zabel, Jr., 2060 Hanover Drive,
Cleveland Heights, Ohio 44112
Filed Oct. 23, 1965, Ser. No. 503,146
6 Claims. (Cl. 214—62)

This invention relates to a system for the unloading or dumping of bulk materials primarily but not exclusively from railroad trains. More specifically it relates to an improved system for unloading bulk materials such as coal and iron ore from bulk carrying transport cars by inverting the hopper portion of the cars while in motion and then returning them to their initial position.

Bulk materials are usually carried in connected transport cars. The unloading of these transport cars has always been a problem because of the time and effort required. That is, it has usually been necessary to uncouple the cars, bring each car onto a separate spur track and then unload it. Needless to say it would be extremely desirable from an economic viewpoint if the unloading time could be shortened. The unloading time could, in fact, be substantially lessened if the transport cars would not have to be uncoupled and could dump the material as they travelled in a forward path. If this were accomplished the extra spur track for unloading could also be eliminated.

Since the bulk material receiving facilities at railroad stations may be on either side of a track it is also advantageous if the transport cars are able to unload their bulk materials from either side. For minimum cost, it is also desirable that the locomotive pulling the transport cars is the only motive power necessary for the unloading procedure.

Patent No. 2,121,365 by Pardee proposes an apparatus for the dumping of bulk materials that are shipped by means of coupled mine cars. It is therein suggested that a pair of spaced helical guiding elements be diametrically positioned relative to a common axis. Mine cars are provided with a pair of supporting elements, one on each side of each car to correspond with the helical guiding members. The supporting elements are positioned so that as a mine car moves in a direction along the axis of the helical members these supporting elements will engage the helical guides. Subsequently the mine cars travel along and are supported by the helical guides in such a manner that the complete car will make an entire revolution about the common axis of the helices.

It should be noted in this reference that the entire mine car is completely elevated and rotated. Because several mine cars go through this process simultaneously it is obvious that an extremely high amount of motive power relative to the weight of the transport cars is required. This is especially true when it is remembered that all cars in the train must be inverted whether they are to be unloaded or not. This, of course, results in a waste of energy and money. This system is feasible when the smaller mine cars are unloaded but the apparatus is not practical for use in the much larger and heavier railroad ore carrying cars that are now common. Furthermore this unloading system is only operable if approached from one direction and this implies a special track for reversing direction if a train is approached from the wrong direction.

In the Hyde Patent No. 1,014,396 a solution is also proposed for the unloading of railroad cars. This reference discloses the use of a supporting track frame and a body or hopper pivotably mounted thereon. The body is pivoted about the rear axle and has rollers mounted along the sides of the body near the front. A pair of inclined rails is provided along the sides of the track to engage the rollers. As the cars approach and the rollers engage the rails the front end of the body rises. As it rises the rear end of the body drops down to a position where a gate-like device is opened so that the coal, or other bulk material may be dropped between the tracks.

The Hyde reference has inherent limitations. This is clear when it is considered that an elaborate and expensive structure would be required to allow the materials to fall between the rails. That is, this system would necessitate extensive excavation to establish a receiving means between the rails and a substantial structure to support the train over this excavation. Of course it would be impossible to use this car with existing unloading facilities.

The present invention proposes a system to rapidly unload connected bulk carrying cars quickly and efficiently. It provides for a system which requires no externally activated device or external power to dump the transport cars. In other words, the only power required is that available from the source of motive power which normally moves the transport cars. Optional provisions are also made wherein the transport cars may be unloaded on either side of the tracks without uncoupling them. Since the transport cars may dump on either side this gives the further added advantage that the chute which receives the bulk material may be located on either side of the track.

Another advantage of the present system, wherein the transport cars may be dumped on either side, is that they may then approach the dumping area from either direction regardless of which side the receiving chute is located. Thus any extra track necessary to turn around may be eliminated.

This invention also eliminates the necessity of having a special spur loop track which passes through a dumping station. This is because the unit train, consisting of any number of loaded bulk material transport cars up to a given maximum number consistent with the motive power available, can be unloaded by simply running the train through the dumping system and then continuing on its way without any uncoupling or stopping.

The present system has special utility since the cross-sectional area of the conventional hopper cars and gondola cars which conform to railway clearing standards will be approximately the same or less than that of the cars used in the present invention. This means that the conventional transport cars may pass through the system without being unloaded or in any way affected by the present unloading system. However, should standard cars be wider than the transport cars used herein, then an uncoupling would be necessary.

Specifically the present invention contemplates an unloading system which comprises a truck, a hopper pivotably supported and attached to said truck and an engaging means on the hopper. A guide means is also provided to interact with the engaging means in order to pivot the hopper about the truck to an unloading position while the truck moves in a generally horizontal path and then return the hopper to its rest position on the truck.

Rollers mounted on supports may also be utilized to bring the transport cars to a common level in order that they may enter the unloading system without any difficulty.

FIG. 1 is a top view of the unloading system of this invention.

FIG. 2 is a side view of the unloading system of this invention.

Figure 3:
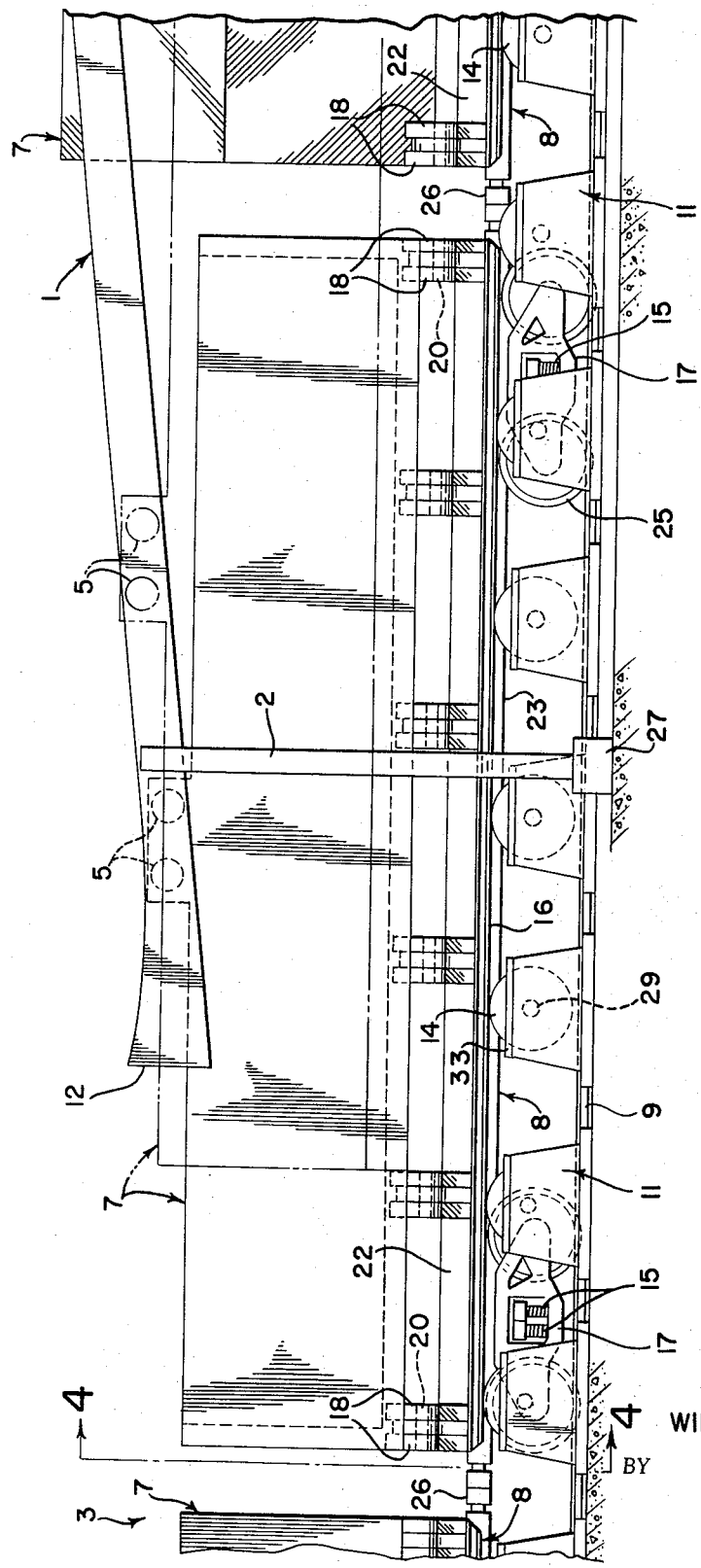
FIG. 3 shows the rollers mounted on the hopper engaging the guide means.

FIGS. 1 and 2 show a group of coupled transport cars 3 passing through the unloading system of this invention. Rollers 5 are generally positioned at the side of the transport cars in order to facilitate their easy entry into the spiral-like cam track 1. As shown more clearly in FIG. 2 the rollers 5 are usually placed near the top of the transport cars 3. The shape of the spiral-like cam track is such that as the rollers engage it, the cam track will lift a hopper portion 7 of the transport car 3 away from its truck 8. The hopper 7 is pivoted about the side of the truck 8 and dumped. It is then returned to its initial position. More specifically, the spiral cam track rises and twists simultaneously and then lowers to a position where the hopper 7 of the car 3 will be inverted. At this point the spiral cam track 1 again rises upward at the same time twisting to a position on the other side of the tracks 9.

The spiral-like cam track 1 is designed, for approximately ten feet at both ends, as a cam for uniformly accelerated movement of the rollers and also for approximately ten feet on both sides of the transition point between the hopper dump section of the cam track and the hopper return section of the cam track. The balance of the cam track is designed for constant velocity movement of the rollers. The uniformly accelerated movement sections are for the purpose of obtaining initial gentle contact of the lifting rollers on the cam track and also to gradually apply the lifting power to the transport car's hopper at the start of the hopper dump and hopper return operation.

The cam track 1 has a rise and fall of approximately 1½ inches per foot of transport car travel and a projected lateral movement in the horizontal plane of approximately 3 inches per foot of transport car travel. When the car hopper 7 has pivoted approximately 55 degrees the lifting roller is in the highest section of the cam track and the center of the gravity of the hopper and its load is approximately above the pivoting mechanism. As the car continues forward further pivoting of the hopper 7 is taken over by the force of gravity. This position occurs as shown in FIGS. 1 and 2 approximately one car length beyond the start of the cam track. Thus only one loaded hopper is lifted at a time while the preceding two hoppers are lowered by gravity as they pass through the hopper dumps section of the dumping station. At the same time two emptied hoppers are lifted and one preceding hopper is lowered by gravity in the hopper return section of the dumping station.

The maximum power demand is placed on the locomotive when the first car of a train is going through the lifting portion of the hopper dump cam section. After the whole length of the cam track is filled with cars the net power demand is lower because the energy returned by the two partially full cars in the declining portion of the hopper dump cam section and the one emptied car in the declining portion of the hopper return cam section is greater than the energy required to lift the two empty cars in the lifting portion of the hopper return cam section.

As shown in FIGS. 1 and 2 the depressed horizontal track section continues to a point equal to 1½ car lengths past the end of the spiral-like cam track where the lowering cam roller of each successive transport car leaves the cam track. At this point the depressed horizontal track section goes into a track incline section which is exactly equal but in opposite slope to the track decline section. As the emptied cars pass over the track incline section the car weight is returned to the truck. Therefore when all of the transport cars in the train have passed through the cam track and over the track incline section they have returned to the original horizontal transport track level.

Roller support assemblies 11 may be used to bring the transport cars to a predetermined level so that it is absolutely certain that the rollers 5 will properly engage the mouth 12 of the spiral-like cam track 1. However, it is anticipated that the mouth 12 of the spiral-like cam track 1 may be expanded to such a dimension that the rollers 5 of the transport cars will engage it even without the aid of the roller support assemblies 11.

Roller support assemblies 11 may be used to maintain the cars at the proper level for the rollers 5 to engage the spiral-like cam track 12. The usual procedure is to have the rollers at a predetermined height and then gradually lower the ground on which the railroad track is laid until the car is completely supported on the roller support assemblies 11.

FIG. 3 indicates the rollers 5 engaging the spiral-like cam track 1 as it lifts the hopper 7 away from the truck 8. That is, as the transport car 3 moves from left to right the hopper 7 is raised from the grid support frame 22 by the rollers 5 being lifted by the spiral-like cam track 1. As the hopper 7 is lifted, it pivots about bearings 13.

One of the supports 2 for the spiral-like cam surface is also illustrated in this figure, as well as truck springs 15 mounted in truck frames 17.

The roller support assemblies 11 support a roller 14 which in turn abuts and rolls about a support runner 16 which is attached under the length of the truck 8.

When the roller support assemblies are used to bring the transport cars to a common level, the ultimate purpose is to lower each transport car 3 so that its runners 16 make contact with the support rollers 14 and the weight of the transport car 3 is transferred from the truck springs 15 to the support rollers 14. This is accomplished by running the transport car 3 down a gradually declining section of track. In a conventional 70 ton hopper car the truck springs have a total possible deflection of 1¼ inches from free length with not even the weight of an empty car on them. Using this figure as an example and assuming it to apply for the bulk transport cars in this system, it can be seen that the tops of the rollers of the roller support assemblies need be at a distance of 1¼ inches plus say an additional ⅜-inch below the bottom contact surface of the transport car support rails. This 1⅝ inches is then the total amount of the drop which is required in the section of the railroad track which is sufficient to lower any transport car regardless of its load or spring condition from the truck springs to the support rollers. This drop is distributed evenly over an approach distance by successively making deeper notches in the railroad ties so that the rails can be laid with a proper drop in angle of decline. It should be noted that the weight transfer operation can also be accomplished by having the track section horizontal and placing a comparable incline and a series of roller support assemblies on either side of the tracks section. However it is simpler to lay the track in a decline on the ties than to successfully shim up the roller support assemblies on the ties.

When using the roller support assemblies 11 all transport cars go into the dumping station being supported by the horizontal support rollers at a constant height. Therefore the leading cam roller of every transport car enters the bell mouth opening of the spiral-like cam track 1 at the correct constant height. As each car passes through the spiral-like cam track its hopper is dumped and returned as described above.

It should be noted that the cars are coupled by a conventional coupling means 26 and are unloaded while still coupled.

Figure 4:
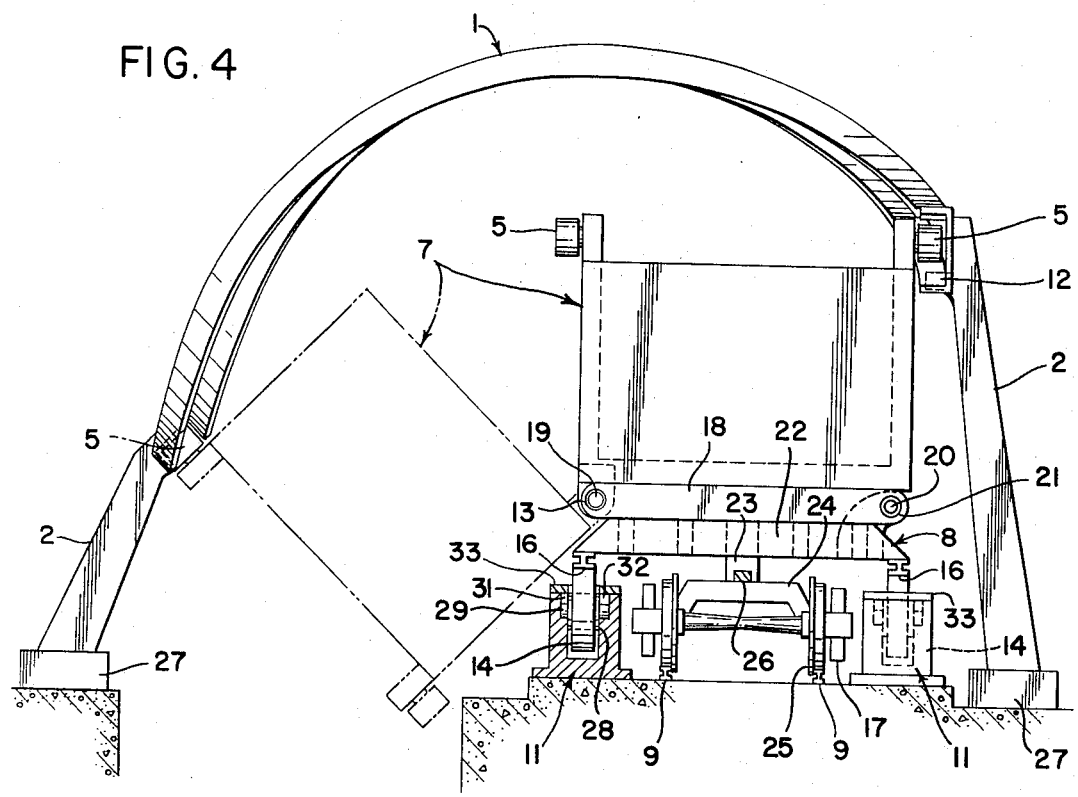
FIG. 4 shows the hopper unloading to the left.

FIG. 4 is a sectional taken along 4—4 of FIG. 3. It shows a section of the spiral-like cam track 1 supported by supports 2. Rollers 5 are engaged in a spiral-like cam track 1. It should be noted at this point that the cross-section of this spiral-like cam track 1 is generally channel-shaped in order that the rollers 5 may easily roll along inside of it. The cam track may also be L-shaped except at other parts of the track where there is a transition from an inclining to a declining section or vice-versa. Supports 2 are secured to the ground or other platforms by use of a securing means 27. The hopper 7 rests on a swing bar 18. There are several swing bars supporting the hopper 7. At each end of each swing bar, trunnions 19 and 20 are placed therethrough. The trunnion 19 is mounted in bearing 13 about which hopper 7 pivots to the left, as viewed in FIG. 4.

A grid support frame 22 is mounted below the swing bars 18. The grid support frame rests on truck 8. The truck 8 consists of a center sill 23, a truck bolster 24 and the usual wheel axle assembly 25. The wheels of the railroad car ride along tracks 27 when in usual operation.

During unloading the truck and hopper is supported by the roller support assemblies 11. The roller support assemblies consist of rollers 14 in which a bearing 28 is mounted about an axle 29. The axle fits into the housing by means of slots 31 and 32. A covering 33 is placed over the top of the assembly allowing only the roller 14 to be exposed to view. The support runners 16 travel along the roller support assemblies 11 in order to suspend the transport car above the tracks 9.

It is seen that during this operation the weight of the pivoting hopper 7 is transmitted from the trunnions 19 and 20 through the grid support frame to the support rails which ride on the support rollers 14. The trunnions 19 and 20 are located nearer to the center line of the hopper than the support runners 16 and support rollers 14 so that the grid support frame 22 of the transport car is prevented from tipping during the hopper dump and return operations. Side movement during these operations between the support runners is reduced to a minimum by side movement resisting devices built into the car trucks. The frictional resistance developed between the runners 16 and the rollers 14, and the forward pulling force of the locomotive also reduce side movement. Another method of controlling side movement is to provide flange support rollers similar to the flanged wheels of the car trucks or provide support rails or runners with the right angle cross-section so that the vertical legs of the runners act as flanges against the support rollers in the same manner as wheel flanges against a rail. It should also be noted here that the relative positions of the support rails and support rollers can be reversed. However the above described embodiment is preferred because it lends itself more readily to a car design which must meet railway clearance specifications. Also it is more economical to place the roller support assemblies at a relatively few dumping stations compared to placing lower support or wheel assemblies on many bulk material transport cars.

However again it must be stated that it is not necessary to have the roller support assemblies in order to use the spiral-like cam track for dumping of hopper cars. That is, as long as the mouth 12 of the spiral-like cam track 1 is of a sufficient width, it may accept the rollers 5 on the hopper cars at whatever height they appear at the entrance to the dumping station.

It should be noted in FIG. 4 that as the hopper 7 pivots to the left the swing bar 18 remains horizontal on the truck 8.

Figure 5:
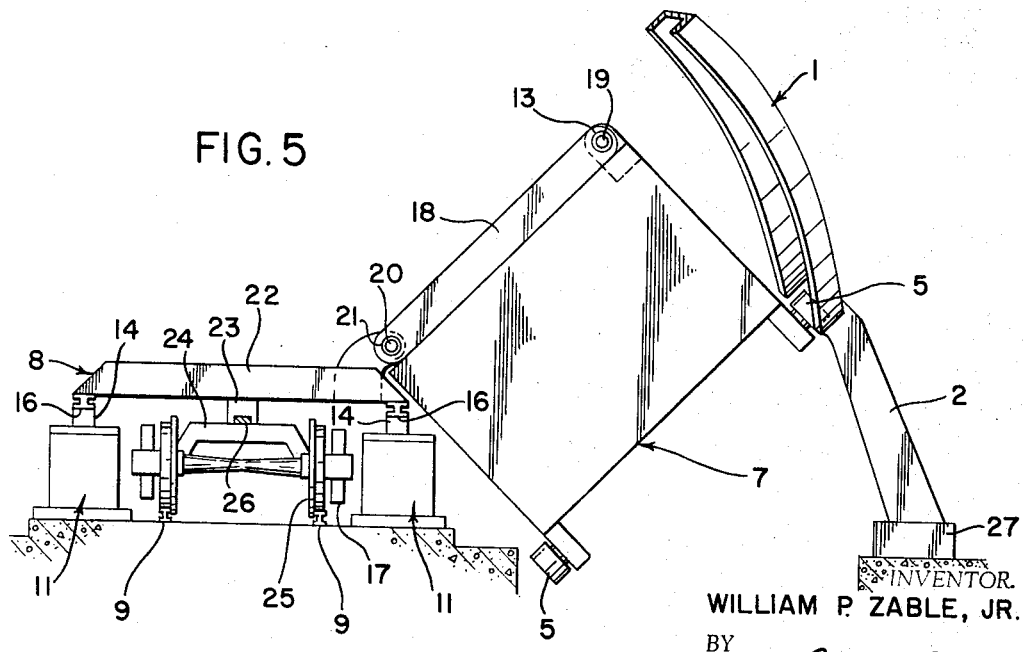
FIG. 5 shows the hopper unloading to the right.

FIG. 5 shows the hopper 7 pivoting to the right. Everything in FIG. 5 is identical to FIG. 4 in operation except that the swing bar 18 now pivots with the hopper 7. It pivots about a trunnion 20 mounted in bearing 21.

Although one dumping roller can be used to dump and return the transport car hopper 7, two rollers 5 are preferred so that the second roller can perform both dumping and return operations in the event one roller would become inoperable, thus providing a 100% safety factor. The roller diameters, roller spacing, and a spacing between the two bearing surfaces of the spiral-like cam track are so designed as to have the leading roller initially make contact after it has entered the bell mouth opening 12 of the cam track 1 on the cam track lower bearing surface and maintain this contact until the roller has reached the point where the instantaneous center of gravity of the turning partially emptied hopper is directly above the pivot trunnions. The leading roller has been lifting and turning the hopper to this point. Now the weight of the hopper causes it to continue to turn and the roller contact is transferred from the leading roller to the lagging roller. The lagging roller now supports and controls the lowering and turning of the hopper until it reaches its lowest dumping position as shown in FIGS. 1 and 2. At this point roller contact is transferred again to the leading roller which starts lifting and turning the emptied hopper back towards its initial position. Just after the center of gravity of the emptied hopper is above the pivot trunnions roller contact is again transferred back to the lagging roller and the hopper weight causes the hopper to turn and lower to its normal transport position. Another advantage of two rollers instead of one is that the rollers always roll in a forward motion and there is no reversal of rolling action as occurs with the use of a single roller. Still another advantage of two rollers instead of one is a longer roller life. The left hand hopper maximum pivot position in FIG. 4 shows how the hopper turns about the ends of the swing bars which lie at rest on the bottom support frame during this operation. The right hand hopper maximum pivot position shows how the hopper pivots to the right along with the swing bars.

Considering the heavy components of the automatic self-unloading system of this invention good operating principles would dictate that the transport cars be run slowly through the dumping station. Approximately 1.8 miles per hour can be considered a workable speed. If the transport cars are pulled through the dumping station at this speed each car is turning over and dumping for a period of 42 seconds while traveling 112.5 feet or one-half of the cam track lane. Approximate distance between the rollers of two successive cars is forty feet. Therefore one car will complete the dumping operation every 15 seconds. The transport cars are therefore automatically dumped at a rate of 4 cars per minute or 240 cars per hour and dump 16,800 tons of bulk material per hour based on 70 ton loads in the transport cars. This dumping rate can be considered to be conservative so that the larger transport cars, larger cam track, and faster speed through the dumping station will result in an appreciable increase in the dumping rate.

While this invention has been described with respect to its preferred embodiment, this is not to be considered as limitative. It is anticipated that modifications will be obvious to one skilled in the art.

I claim:
1. An unloading system for dumping transport cars comprising:
   (a) a hopper;
   (b) a truck supporting said hopper;
   (c) means attached to said hopper and said truck for pivoting said hopper about a side of said truck, said means for pivoting including a grid support frame extending laterally beyond the sides of said truck;
   (d) engaging means on said hopper;
   (e) a guide means which cooperates with said engaging means to pivot said hopper about said truck to an unloading position while said truck moves in a generally horizontal path and then return said hopper to its rest position on said truck; and
   (f) means for positioning said truck and said hopper at a correct level so that said engaging means may cooperate with said guide means, said means for positioning including support means at the outer edges of said support frame and cooperating support assemblies in position along the truck path to hold at least some of the weight of the transport car during unloading.

2. The unloading system of claim 1 wherein said guide means includes a spiral-like cam track supported over said railroad tracks.

3. The unloading system of claim 2 wherein said engaging means include a roller mounted on the side of said hopper.

4. The unloading system of claim 3 wherein said means for maintaining said truck at a constant height includes support runners along each side of said grid support frame and roller support assemblies in a row along each side of said track so that said support runners may run on rollers in said roller support assemblies and support said car at a constant level while the tracks on which said car is travelling is gradually lowered.

5. The unloading system of claim 3 wherein there are means for pivoting said hopper about either side of said truck.

6. The unloading system of claim 4 wherein said means for pivoting said hopper about either side of said truck includes a grid support frame having transverse members, swing bars above said grid support frame, support bearings in each end of each swing bar, the bearings on one side of said car in said swing bars being fixed to the sides of said grid support frame and the bearings on the other side of said car being fixed to the hopper bottom, so that as the hopper pivots to one side it will carry the swing bars with it but will not carry them as it swings in the other direction.

References Cited

UNITED STATES PATENTS

| | | | |
|---|---|---|---|
| 708,698 | 9/1902 | Dodge | 214—62 |
| 914,925 | 3/1909 | Chance | 105—272 |
| 1,047,252 | 12/1912 | Lawson | 214—62 |
| 1,893,633 | 1/1933 | Peterson et al. | 214—62 |

HUGO O. SCHULZ, *Primary Examiner.*

ROBERT G. SHERIDAN, *Examiner.*